United States Patent
Madisetti (10) Patent No.: US 7,610,468 B2
(45) Date of Patent: Oct. 27, 2009

(54) MODIFIED BUDDY SYSTEM MEMORY ALLOCATION

(75) Inventor: Prashanth Madisetti, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 340 days.

(21) Appl. No.: 11/553,444

(22) Filed: Oct. 26, 2006

(65) Prior Publication Data

US 2008/0104353 A1 May 1, 2008

(51) Int. Cl.
  G06F 13/00 (2006.01)
  G06F 13/28 (2006.01)
(52) U.S. Cl. .................................... 711/171
(58) Field of Classification Search ............. 711/171
  See application file for complete search history.

(56) References Cited

U.S. PATENT DOCUMENTS

| | | | |
|---|---|---|---|
| 4,849,878 A | 7/1989 | Roy | |
| 5,394,537 A | 2/1995 | Courts et al. | |
| 5,490,274 A | 2/1996 | Zbikowski et al. | |
| 5,566,302 A | 10/1996 | Khalidi et al. | |
| 5,588,138 A | 12/1996 | Bai et al. | |
| 5,651,136 A | 7/1997 | Denton et al. | |
| 5,713,002 A | 1/1998 | Zbikowski et al. | |
| 5,732,402 A | 3/1998 | Lehman | |
| 5,742,793 A | 4/1998 | Sturges et al. | |
| 5,761,536 A | 6/1998 | Franaszek | |
| 5,802,599 A | 9/1998 | Cabrera et al. | |
| 5,835,959 A | 11/1998 | McCool et al. | |
| 5,864,867 A | 1/1999 | Krusche et al. | |
| 5,930,827 A | 7/1999 | Sturges | |
| 6,003,123 A | 12/1999 | Carter et al. | |
| 6,032,160 A | 2/2000 | Lehman | |
| 6,131,150 A | 10/2000 | DeTreville | |
| 6,298,428 B1 | 10/2001 | Munroe et al. | |
| 6,412,053 B2 | 6/2002 | Bonola | |
| 6,446,183 B1 * | 9/2002 | Challenger et al. | 711/170 |
| 6,505,284 B1 | 1/2003 | Rabinovici et al. | |
| 6,625,710 B2 | 9/2003 | Bonola | |
| 6,636,956 B1 | 10/2003 | Venkatachary et al. | |
| 6,643,754 B1 | 11/2003 | Challenger et al. | |
| 6,658,437 B1 | 12/2003 | Lehman | |
| 6,678,697 B2 | 1/2004 | Sexton et al. | |
| 6,757,802 B2 | 6/2004 | Trainin et al. | |
| 6,839,822 B2 * | 1/2005 | Knippel et al. | 711/170 |
| 6,851,034 B2 | 2/2005 | Challenger et al. | |

OTHER PUBLICATIONS

Kaufman, Arie, Variations on the binary buddy system for dynamic memory management, 1980, ACM, pp. 73-78.*
Kaufman, Tailored-List Recombination-Delaying Buddy Systems, ACM, 1994.*

(Continued)

*Primary Examiner*—Matt Kim
*Assistant Examiner*—Edward J Dudek (57) ABSTRACT

A modified buddy system memory allocator of an apparatus in an example receives a request for a size of memory. The modified buddy system memory allocator identifies a plurality of contiguous, differently-sized memory blocks that are each smaller than the size of memory from the request. The modified buddy system memory allocator allocates the plurality of contiguous, differently-sized memory blocks to satisfy the request for the size of memory.

18 Claims, 5 Drawing Sheets

OTHER PUBLICATIONS

The Memory Management Reference Beginner's Guide Allocation, pp. 1-4.
Buddy Memory Allocation, from Wikipedia.com, pp. 1-3.
The Memory Management Glossary: I.
The Memory Management Glossary: A, 3 pages.
Definition of "buddy system" from NIST.gov.
Definition of "bucket" from NIST.gov.
The Memory Management Glossary: B.
The Memory Management Glossary: C.
The Memory Management Glossary: E.

* cited by examiner

MODIFIED BUDDY SYSTEM MEMORY ALLOCATION

BACKGROUND

Memory allocation systems assign blocks of memory on request. A memory allocation system employs an allocator to receive relatively large blocks of memory from an operating system and allocate that memory to satisfy memory requests. Upon receipt of a request for a relatively small block of memory, a standard and/or conventional allocator satisfies the request by dividing one of the large blocks of memory into multiple smaller blocks.

A known, standard, and/or conventional memory allocation system is the buddy system. The buddy system divides allocatable blocks of memory into pairs of contiguous equally-sized blocks, for example, buddies. The buddy system employs a buddy system memory allocator that allocates memory blocks of certain permitted sizes. The permitted sizes may be powers of two, such as 4 KB (kilobytes), 8 KB, 16 KB, 32 KB, 64 KB, 128 KB, etc. In another example, the permitted sizes form a Fibonacci sequence, such as 16 KB, 32 KB, 48 KB, 80 KB, 128 KB, etc. Therefore, each memory block in the buddy system except the smallest allowable memory block can be divided into two smaller blocks of permitted sizes.

The buddy system memory allocator also maintains many free block lists, for example, memory buckets. The buddy system memory allocator maintains one free block list for each of the permitted memory block sizes. Where the permitted memory block sizes are 4 KB, 8 KB, 16 KB, 32 KB, 64 KB, 128 KB, etc., the buddy system memory allocator may maintain a free block list for available 4 KB memory blocks, a free block list for available 8 KB memory blocks, a free block list for available 16 KB memory blocks, a free block list for available 32 KB memory blocks, a free block list for available 64 KB memory blocks, a free block list for available 128 KB memory blocks, etc. The free block lists comprise all the available blocks of a particular size. For example, the free block list for 16 KB memory blocks comprises all of the available 16 KB memory blocks.

When the buddy system memory allocator receives a request for a size of memory, the buddy system memory allocator rounds the requested size up to the size permitted in the buddy system, and returns the first block from the free block list for memory blocks of that permitted size. If the free list for memory blocks of that permitted size is empty, then the buddy system memory allocator splits a larger permitted size memory block and allocates one of the split pieces of memory to satisfy the original memory request. The buddy system memory allocator adds the other split pieces remaining from the satisfied memory request, to the appropriate lists of free blocks of permitted memory sizes in that buddy system.

When memory blocks are released, the buddy system memory allocator may attempt to join, merge, or coalesce two contiguous equally-sized memory blocks or buddies into a single memory block of a larger permitted size. For example, if two 16 KB memory blocks are available and contiguous, the buddy system memory allocator may attempt to coalesce the two 16 KB memory blocks into one 32 KB memory block. The coalescence requires the memory blocks to be contiguous.

In a known, standard, and/or conventional buddy system, the following requirements apply for two blocks of memory to qualify as buddies: 1) the two blocks of memory must be contiguous, 2) the two blocks of memory must be of equal size, and 3) the starting address of the combined block must be aligned to the size of the combined size. For example, if two 16 KB size blocks are to be combined into a 32 KB size, the starting address of the 32 KB size block should at least be 32 KB size aligned; that is, the 32 KB sized block needs to have a starting address that is a multiple of 32 KB to be aligned in the buddy system.

DESCRIPTION OF THE DRAWINGS

Features of exemplary implementations of the invention will become apparent from the description, the claims, and the accompanying drawings in which:

DETAILED DESCRIPTION

As described in the BACKGROUND section above, known, standard, and/or conventional buddy systems, as an exemplary shortcoming, create relatively large amounts of external memory fragmentation. External memory fragmentation occurs when the buddy system memory allocator divides large memory blocks to satisfy memory requests and leaves many smaller memory blocks unallocated. The small blocks may be too small to satisfy most memory requests, and the small blocks will therefore accumulate over time. When large amounts of external memory fragmentation occur, the system may run out of memory available to satisfy larger memory requests.

An exemplary known, standard, and/or conventional strategy to reduce external memory fragmentation in the buddy system is to allocate blocks that are only the permitted sizes. However, this strategy increases the amount of internal memory fragmentation. Internal memory fragmentation occurs when the buddy system memory allocator allocates more memory than is actually requested. Another exemplary known, standard, and/or conventional strategy to reduce external memory fragmentation in the buddy system is to classify memory requests based on the length of time that the memory will be needed. This strategy classifies all memory requests as either short-term allocations or long-term allocations. In an attempt to increase coalescing opportunities, this strategy groups together the short-term allocations and separately groups together the long-term allocations. However, this strategy requires multiple buddy system allocators for the multiple groups and may not improve external fragmentation in the long-term allocation group.

So, exemplary known, standard, and/or conventional buddy system memory allocators create relatively large amounts of external memory fragmentation. For example, exemplary known, standard, and/or conventional buddy system memory allocators result in many available memory blocks that may not be able to be coalesced and are also too small to satisfy a larger memory request. Thus, a need exists for an enhanced and/or modified buddy system memory allocator that determines whether the available memory blocks comprise a plurality of contiguous, differently-sized memory blocks that collectively add up to a size that would satisfy the larger memory request. By employing a plurality of contiguous, differently-sized memory blocks to satisfy a memory request, the enhanced and/or modified buddy system memory allocator in an example leads to better utilization of memory and reduces memory pressure on the system. Also, the use of the plurality of contiguous, differently-sized memory blocks to satisfy a memory request in an example reduces memory fragmentation.

Figure 1:
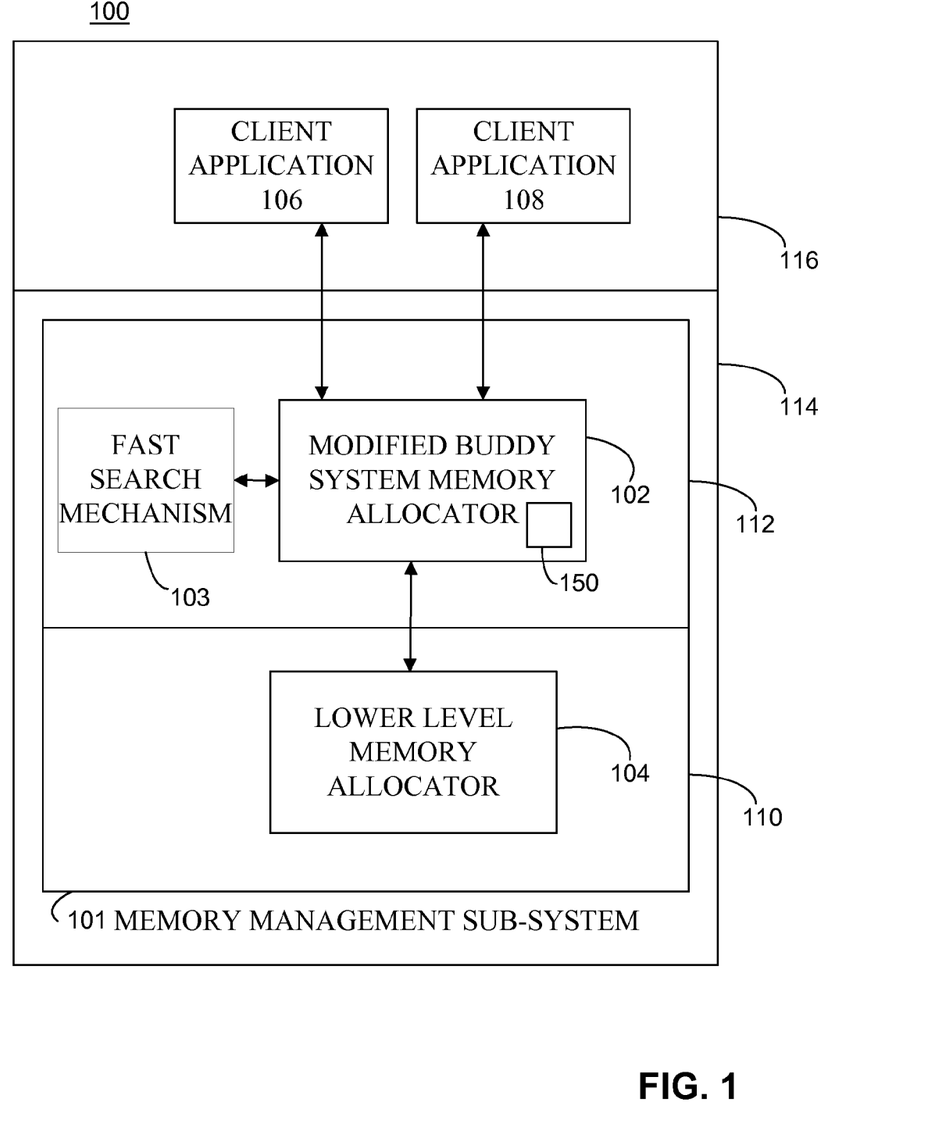
FIG. 1 is a representation of an implementation of an apparatus that comprises one or more memory management sub-systems and one or more client applications, and illustrates an exemplary memory management sub-system that comprises one or more modified buddy system memory allocators, one or more indexers and/or fast search mechanisms, and one or more lower level memory allocators according to a preferred embodiment of the invention.

Turning to FIG. 1, an implementation of an apparatus 100 in an example comprises one or more memory management sub-systems 101 and one or more client applications. An exemplary memory management sub-system 101 comprises one or more modified buddy system memory allocators 102, one or more indexers and/or fast search mechanisms 103, and one or more lower level memory allocators 104. Exemplary client applications comprise client applications 106, 108. The memory management sub-system 101 and the client applications 106 and 108 in an example operate on different levels of the apparatus 100. Within an exemplary memory management sub-system, the modified buddy system memory allocator 102 and the lower level memory allocator 104 operate at different levels. For example, the lower level memory allocator 104 operates on a first level 110 and the modified buddy system memory allocator 102 operates on a second level 112 which are within the memory management sub-system 101. The memory management sub-system 101 in an example operates at a different level 114 than the client applications 106 and 108, which operate on another level 116. An exemplary modified buddy system memory allocator 102 comprises one or more recordable data storage media 150. An exemplary implementation of the index and/or fast search mechanism 103 comprises an algorithm, procedure, program, mechanism, coordinator, module, application, code, and/or logic.

The lower level memory allocator 104 allocates memory to the modified buddy system memory allocator 102 for potential allocation to the client applications 106 and 108. When the client applications 106 and 108 require memory, the client applications 106 and 108 make requests to the modified buddy system memory allocator 102. The modified buddy system memory allocator 102 attempts to satisfy the requests with memory that the modified buddy system memory allocator 102 controls at the time of the request. If the modified buddy system memory allocator 102 does not have sufficient memory to satisfy the request, then the modified buddy system memory allocator 102 requests additional memory from the lower level memory allocator 104 to satisfy the request.

The memory management sub-system 101 in an example is responsible for memory related tasks on the apparatus 100 that comprise memory related tasks of the modified buddy system allocator 102 and the lower level memory allocator 104. For example, the memory management sub-system 101 is responsible for memory related tasks that include and are not limited to the memory related tasks of the modified buddy system allocator 102 and the lower level memory allocator 104. In a further example, the memory management sub-system 101 is also responsible for maintaining state information on different memory objects in the apparatus 100. The memory management sub-system 101 also provides the fast search mechanism 103, for example, to look up the state information of different memory objects within the memory management sub-system 101.

The modified buddy system memory allocator 102 allocates memory blocks of certain permitted sizes. In an example, the permitted sizes are powers of two, such as 4 KB (kilobytes), 8 KB, 16 KB, 32 KB, 64 KB, 128 KB, etc. In another example, the permitted sizes form a Fibonacci sequence, such as 16 KB, 32 KB, 48 KB, 80 KB, 128 KB, etc. Therefore, each memory block in the modified buddy system except the smallest allowable memory block can be divided into two smaller blocks of permitted sizes. Each of these two smaller blocks can be further divided until the smallest allowable memory block size is reached. For example, a programmer can set the smallest allowable memory block size. The programmer in an example sets the smallest allowable memory block size to be one of 1 KB, 2 KB, 4 KB, or the like. In an example, referring to FIG. 2, the smallest allowable memory block size is set to 4 KB.

To satisfy a memory request, the modified buddy system memory allocator 102 in an example divides a memory block into two equally-sized blocks, for example, buddies. The modified buddy system memory allocator 102 may allocate one of the buddies to satisfy the memory request and add the other one of the buddies to a free block list. Once the allocated one of the buddies is released and both of the buddies are available, the modified buddy system memory allocator 102 may attempt to join, merge, or coalesce the two buddies into a single larger memory block. Coalescing involves the joining or merging of two contiguous equally-sized memory blocks.

Figure 2:
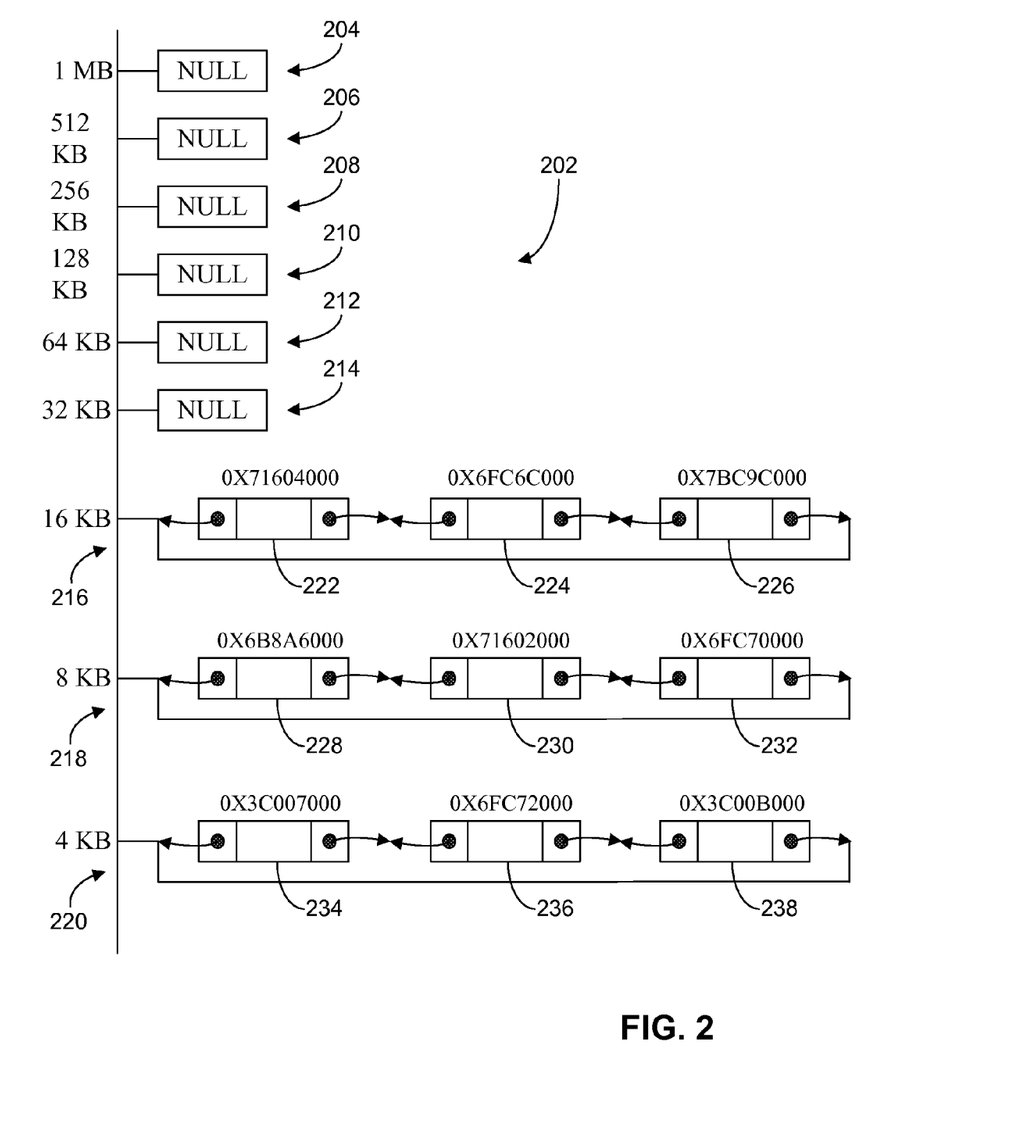
FIG. 2 is a representation of a plurality of free block lists that are employed by the modified buddy system memory allocator of the apparatus of FIG. 1.

Referring to FIGS. 1-2, the modified buddy system memory allocator 102 organizes available memory blocks into a plurality of free block lists 202, for example, memory buckets. The modified buddy system memory allocator 102 in an example maintains one free block list for each of the permitted memory block sizes. For example, where the permitted memory block sizes are 4 KB, 8 KB, 16 KB, 32 KB, 64 KB, 128 KB, 256 KB, 512 KB, and 1 MB (megabyte), the modified buddy system memory allocator 102 maintains a free block list 204 for available 1 MB memory blocks, a free block list 206 for available 512 KB memory blocks, a free block list 208 for available 256 KB memory blocks, a free block list 210 for available 128 KB memory blocks, a free block list 212 for available 64 KB memory blocks, a free block list 214 for available 32 KB memory blocks, a free block list 216 for available 16 KB memory blocks, a free block list 218 for available 8 KB memory blocks, and a free block list 220 for available 4 KB memory blocks. The modified buddy system memory allocator 102 in an example may also organize available memory blocks of other sizes into additional free block lists, as will be appreciated by those skilled in the art. Each of the free block lists 202 in an example comprises all the available memory blocks controlled by the modified buddy system memory allocator 102 that are of a particular size. For example, the free block list 216 comprises all of the available 16 KB memory blocks that the modified buddy system memory allocator 102 controls.

Each of the free block lists 202 comprises zero or more memory blocks. In an example, referring to FIG. 2, the free block lists 204, 206, 208, 210, 212, and 214 comprise no memory blocks. The free block list 216 in an example comprises memory blocks 222, 224, and 226. The memory blocks 222, 224, and 226 are each 16 KB. The free block list 218 in an example comprises memory blocks 228, 230, and 232. The memory blocks 228, 230, and 232 are each 8 KB. The free block list 220 in an example comprises memory blocks 234, 236, and 238. The memory blocks 234, 236, and 238 are each 4 KB.

When the modified buddy system memory allocator 102 allocates a memory block, the modified buddy system memory allocator 102 removes that memory block from the free block list 202 that corresponds to the size of the memory block. As additional memory blocks become available, the modified buddy system memory allocator 102 in an example may add the additional memory blocks to the appropriate ones of the free block lists 202.

The free block lists 202 in an example comprise circular linked lists of memory blocks. In an example, the free block lists 202 use pointers to connect the memory blocks, as will be appreciated by those skilled in the art. For example, each of the memory blocks 222, 224, and 226 in the free block list 216 comprise head pointers and tail pointers to the other memory blocks 222, 224, and 226 in the free block list 216. When adding or removing a memory block to one of the free block lists 202, the modified buddy system memory allocator 102 modifies one or more pointers in the free block list 202 to successfully add or remove the memory block. To add the memory block, the modified buddy system memory allocator 102 selects a location in the free block list 202 for addition of the memory block and modifies the pointers of the adjacent memory blocks in the free block list 202. To remove the memory block, the modified buddy system memory allocator 102 modifies the pointers of the adjacent memory blocks in the free block list 202 so that the adjacent memory blocks point to each other rather than the removed memory block.

Figure 3:
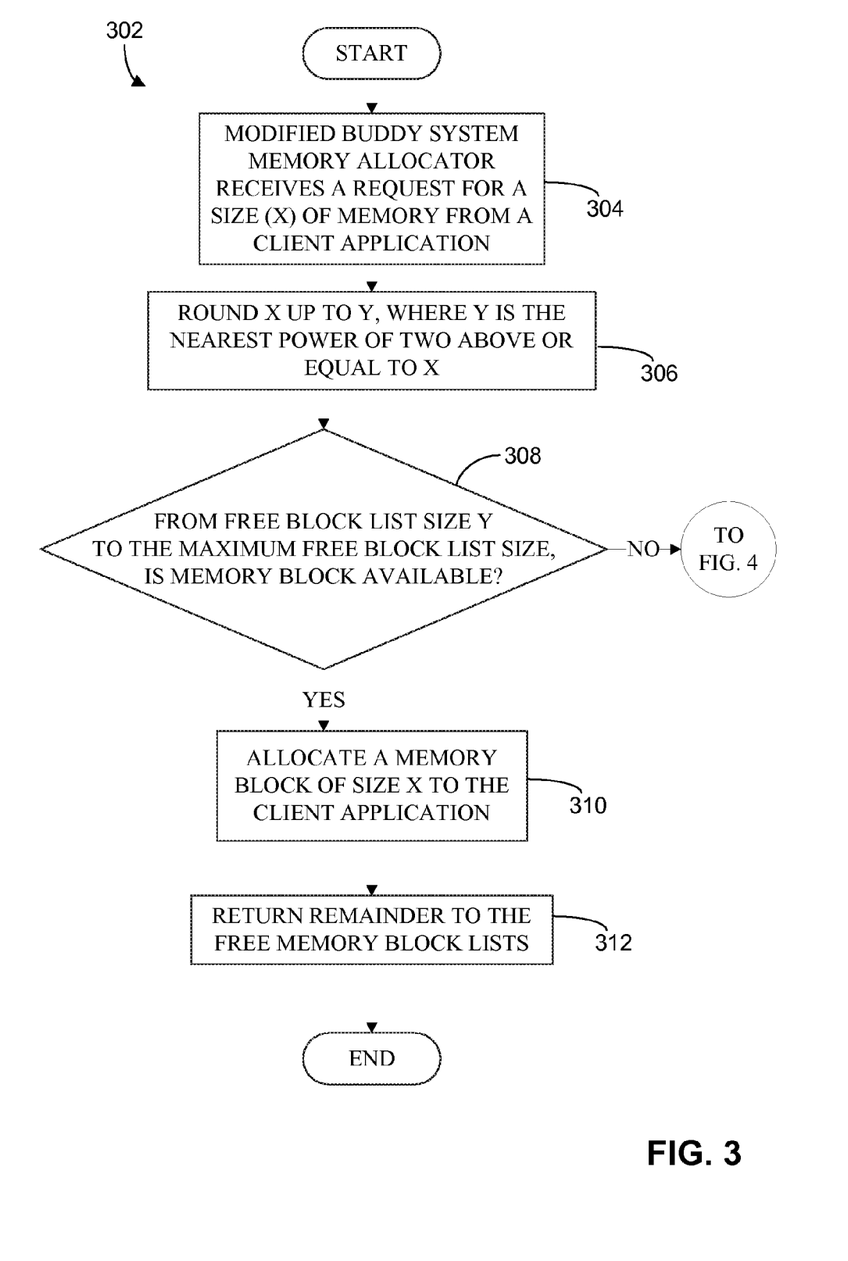
FIG. 3 is a representation of an exemplary logic flow that illustrates an attempt by the modified buddy system memory allocator to satisfy a request for a size of memory made by one of the client applications of the apparatus of FIG. 1.

Referring to FIGS. 1-3, an illustrative description of an exemplary operation of an implementation of the apparatus 100 is presented, for explanatory purposes. In exemplary logic 302, the modified buddy system memory allocator 102 attempts to satisfy a request for a size of memory made by one of the client applications 106 and 108. The requested size of memory is represented in the exemplary logic 302 by the variable X. The requested size (X) of memory may be any value, as will be appreciated by those skilled in the art. In an example, the requested size (X) of memory is a multiple of the smallest allowable memory block size and, referring to FIG. 2, the smallest allowable memory block size is set to 4 KB. For example, the requested size (X) of memory in the exemplary logic 302 is 28 KB.

At STEP 304, the modified buddy system memory allocator 102 receives a request for a size (X) of memory from one of the client applications 106 and 108, for example, the client application 106. After the modified buddy system memory allocator 102 receives the request for the size (X) of memory from the client application 106, STEP 304 proceeds to STEP 306. At STEP 306, the modified buddy system memory allocator 102 rounds the requested size (X) of memory up to the nearest permitted size of a free block list 202 that is greater than or equal to the requested size (X). The nearest permitted size greater than the requested size (X) is represented in the exemplary logic 302 by the variable Y. The free block lists 202 in an example are organized as powers of two. For example, the modified buddy system memory allocator 102 has access to the free block lists 202 that hold memory blocks with sizes of 4 KB, 8 KB, 16 KB, 32 KB, 64 KB, 128 KB, etc. Where the requested size (X) is 28 KB, the nearest power of two above 28 KB is 32 KB. Therefore, the modified buddy system memory allocator 102 rounds the requested size (X) of memory up to 32 KB, and STEP 306 proceeds to STEP 308.

At STEP 308, the modified buddy system memory allocator 102 attempts to locate an available memory block that has a size that is greater than or equal to the size (Y), which in this illustration is 32 KB. First, the modified buddy system memory allocator 102 checks the free block list 214 for an available memory block of size 32 KB. If the modified buddy system memory allocator 102 locates a memory block in the free block list 214, then STEP 308 proceeds to STEP 310. If the free block list 214 is empty, then the modified buddy system memory allocator 102 in an example continues to check the other free block lists 202 for an available memory block of a size larger than 32 KB. For example, the modified buddy system memory allocator 102 checks the free block list 212, followed by the free block list 210, etc. If the modified buddy system memory allocator 102 does locate an available memory block in the free block lists 202 that is at least as large as the size (Y), then STEP 308 proceeds to STEP 310. If the modified buddy system memory allocator 102 does not locate an available memory block in the free block lists 202 that is at least as large as the size (Y), then STEP 308 proceeds to STEP 404 (FIG. 4), as described herein.

At STEP 310, the modified buddy system memory allocator 102 allocates a memory block of the requested size (X) to the client application 106 that requested the memory, as will be appreciated by those skilled in the art. Once the modified buddy system memory allocator 102 has allocated the memory, STEP 310 proceeds to STEP 312. At STEP 312, if the available memory block chosen to satisfy the request is larger than the requested size (X), then the modified buddy system memory allocator 102 returns the remainder from the memory allocation to the appropriate ones of the free block lists 202. In an example, the remainder may be returned to the free block lists 202 since the requested size (X) is a multiple of the smallest allowable memory block size. For example, if the modified buddy system memory allocator 102 located a 32 KB memory block to satisfy the request for 28 KB of memory, then the modified buddy system memory allocator 102 will allocate 28 KB to the client application 106 and add a 4 KB block of memory to the free block list 220. If the modified buddy system memory allocator 102 located a 64 KB memory block to satisfy the request for 28 KB of memory, then the modified buddy system memory allocator 102 will allocate 28 KB to the client application 106, add a 32 KB block of memory to the free block list 214, and add a 4 KB block of memory to the free block list 220.

Figure 4:
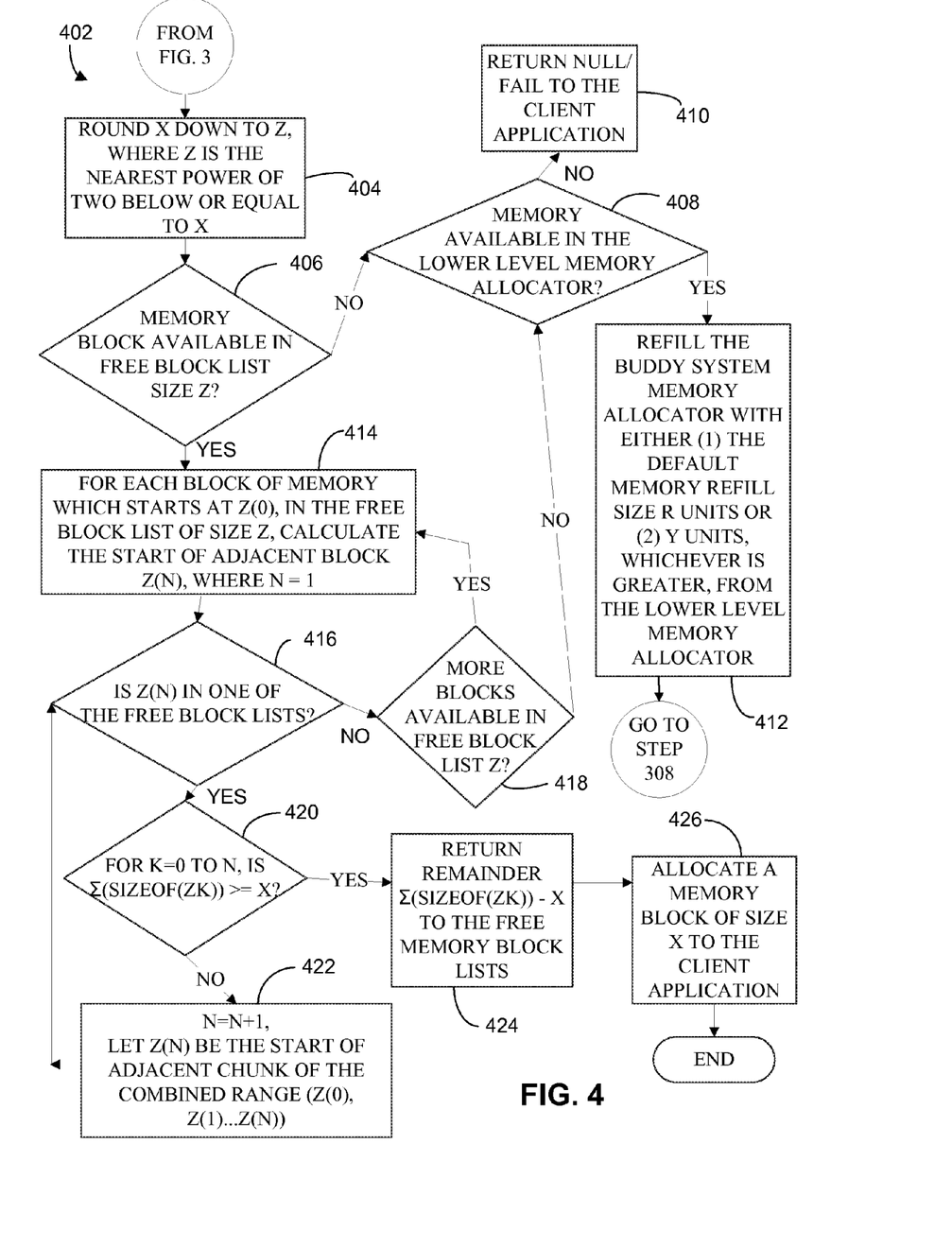
FIG. 4 is a representation of an exemplary logic flow that illustrates an attempt by the modified buddy system memory allocator to satisfy the memory request from FIG. 3 with a plurality of contiguous, differently-sized memory blocks that are each smaller than the requested size of memory.

Referring to FIGS. 1-2 and 4, exemplary logic 402 serves to illustrate an attempt by the modified buddy system memory allocator 102 to satisfy the memory request received at STEP 304 (FIG. 3) with a plurality of contiguous, differently-sized memory blocks that are each smaller than the requested size (X) of memory. As noted above, if at STEP 308 (FIG. 3) the modified buddy system memory allocator 102 does not locate an available memory block in the free block lists 202 that is at least as large as the size (Y), then STEP 308 proceeds to STEP 404.

At STEP 404, the modified buddy system memory allocator 102 rounds the requested size (X) of memory down to the nearest permitted size of a free block list 202 that is less than the requested size (X). The nearest permitted size below the requested size (X) is represented in the exemplary logic 402 by the variable Z. The free block lists 202 in an example are organized as powers of two. For example, the modified buddy system memory allocator 102 has access to the free block lists 202 that hold memory blocks with sizes of 4 KB, 8 KB, 16 KB, 32 KB, 64 KB, 128 KB, etc. Where the requested size (X) is 28 KB, the nearest power of two below 28 KB is 16 KB. Therefore, the modified buddy system memory allocator 102 rounds the requested size (X) of memory down to 16 KB, and STEP 404 proceeds to STEP 406. At STEP 406, the modified buddy system memory allocator 102 checks the free block list 216 for an available memory block of size 16 KB.

If at STEP 406 the modified buddy system memory allocator 102 determines that the free block list 216 is empty, then STEP 406 proceeds to STEP 408. At STEP 408, the modified buddy system memory allocator 102 determines whether additional memory is available in the lower level memory allocator 104. If the lower level memory allocator 104 does not have available memory, then STEP 408 proceeds to STEP 410. At STEP 410, the modified buddy system memory allocator 102 determines that sufficient memory is not available to satisfy the request for the size of memory made by the client application 106. Therefore, the modified buddy system memory allocator 102 returns a Null or Fail result to the client application 106.

If at STEP 408 the lower level memory allocator 104 does have available memory, then STEP 408 proceeds to STEP 412. At STEP 412, memory is allocated from the lower level memory allocator 104 to the modified buddy system memory allocator 102. For example, a memory block large enough to satisfy the request is added to one of the free block lists 202. The lower level allocator 104 in an example allocates to the modified buddy system memory allocator 102 either: a memory block of a default refill size (R), or a memory block of the size (Y). If the size (Y) is smaller than the default refill size (R), then the lower level memory allocator 104 in an example allocates a memory block of the default refill size (R) to the modified buddy system memory allocator 102. If the size (Y) is larger than the default refill size (R), then the lower level memory allocator 104 in an example allocates a memory block of the size (Y) to the modified buddy system memory allocator 102.

The default refill size (R) in an example may be set to any value. For example, the default refill size (R) is set to 64 KB. In this illustration the size (Y) is 32 KB, which is smaller than the 64 KB of the default refill size (R), so the lower level memory allocator 104 allocates the 64 KB of the default refill size (R) of memory to the modified buddy system memory allocator for subsequent allocation to client applications 106 and 108. The modified buddy system memory allocator 102 in an example adds the 64 KB memory block to the free block list 212 for the 64 KB memory blocks.

After allocation of the newly received memory, the modified buddy system memory allocator 102 will allocate a memory block from the newly received memory to satisfy the memory request. For example, the modified buddy system memory allocator will perform STEPS 308, 310, and 312 (FIG. 3) to satisfy the memory request with the newly received memory.

If at STEP 406 the modified buddy system memory allocator 102 locates an available memory block in the free block list 216, then STEP 406 proceeds to STEP 414. For example, the modified buddy system memory allocator 102 locates the memory block 222 in the free block list 216. The modified buddy system memory allocator 102 in an example begins with the memory block 222 on the search for a plurality of contiguous, differently-sized memory blocks that are each smaller than the requested size (X) of memory, but collectively are at least as large as the requested size (X) of memory. The modified buddy system memory allocator 102 is able to proceed regardless whether the address of the memory block 222 is aligned or nonaligned to the rounded up to the next power of 2 value of the requested size (X) of memory; that is, the address of a first memory block or any other memory block to be combined in the plurality of contiguous, differently-sized memory blocks need not be a multiple of the rounded up to the next power of 2 value of the requested size (X) of memory.

At STEP 414, the modified buddy system memory allocator 102 calculates the address ($Z_n$) of a memory block that would be contiguous to the memory block 222. In an example, referring to FIG. 2, the address ($Z_0$) of the memory block 222 is 0x71604000. The memory block that is contiguous to the memory block 222 begins where the memory block 222 ends. Therefore, that contiguous memory block would have an address ($Z_n$) that is 16 KB greater than 0x71604000, specifically, 0x71608000. After the modified buddy system memory allocator 102 calculates that the address ($Z_n$) of the memory block that would be contiguous to the memory block 222 is 0x71608000, STEP 414 proceeds to STEP 416. The modified buddy system memory allocator 102 is able to proceed regardless whether the address ($Z_0$) of the memory block 222 0x71604000 is aligned or nonaligned to the rounded up to the next power of 2 value of the requested size (X) of 28 KB.

For the requested size (X) of 28 KB, the next power of 2 value is 32 KB. This alignment or nonalignment non-requirement means the address ($Z_0$) of a first memory block or any other memory block to be combined in the plurality of contiguous, differently-sized memory blocks need not be a multiple of the rounded up to the next power of 2 value of the requested size (X) of 28 KB. So, for the requested size (X) of 28 KB, the address ($Z_0$) of the first memory block or any other memory block to be combined in the plurality of contiguous, differently-sized memory blocks need not be a multiple 32 KB, which is the next power of 2 value after 28 KB.

Figure 5:
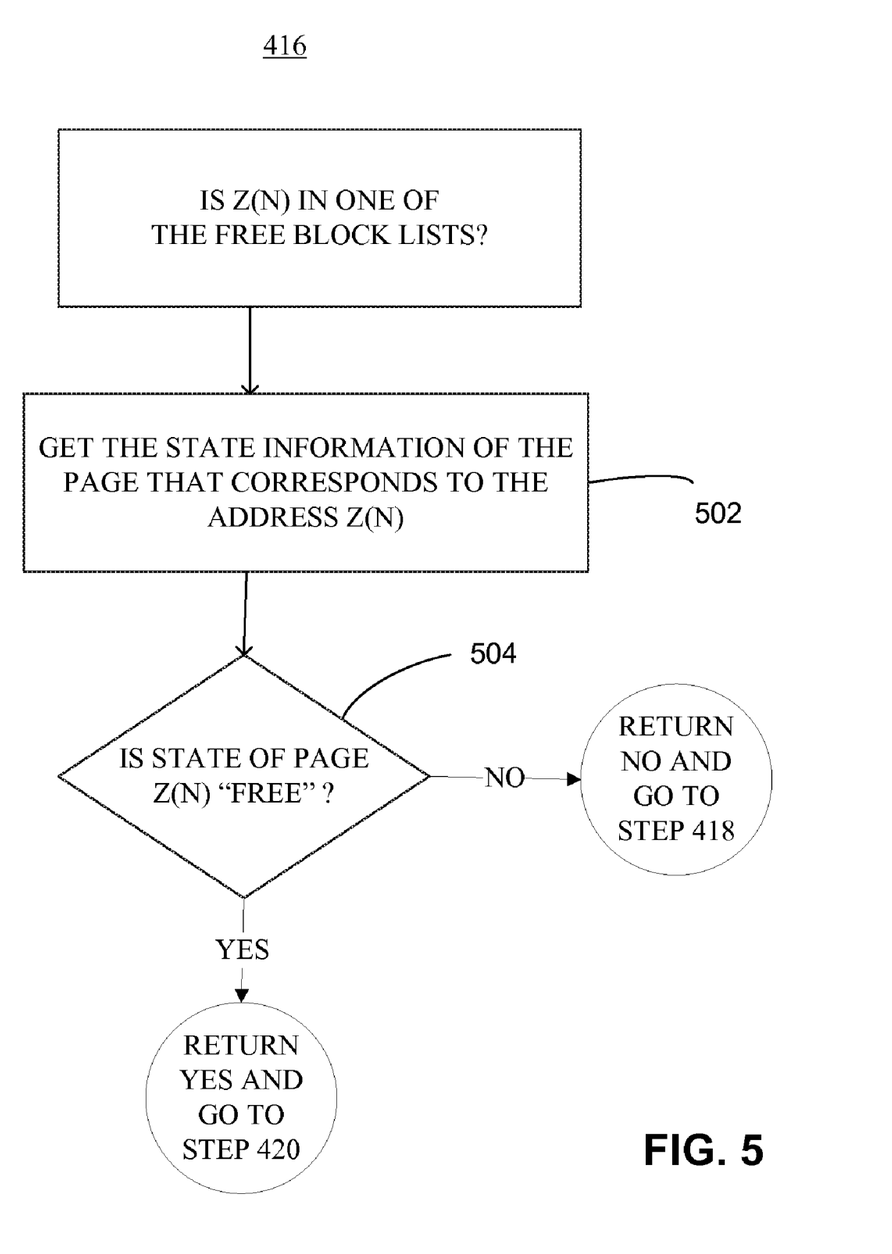
FIG. 5 is a representation of an exemplary logic flow that illustrates a determination by the modified buddy system memory allocator whether a memory block that starts at a target address in the exemplary logic of FIG. 4 is available in one of a plurality of free block lists.

Referring to FIGS. 4 and 5, the modified buddy system memory allocator 102 at STEP 416 determines if the memory block that starts at 0x71608000 is available in one of the free block lists 202. STEP 502 obtains the state information of the page that corresponds to the memory block that starts at 0x71608000. In an example, state information is maintained for each page of memory by the memory management sub-system 101. The state information in an example is updated to indicate all the relevant state changes of that page of memory. For example, the state information field in an example is marked as "In use by buddy allocator" by the memory management sub-system 101, if the page is located in one of the free block lists 202. In a further example, the state information field is marked as "In use by client application" by the memory management sub-system 101, if the page is allocated to one of the client applications 106 and 108. In a still further example, the state information field is marked as "Free" by the memory management sub-system 101, if the page is located in the lower level memory allocator 104.

If the modified buddy system memory allocator 102 allocates a block of memory from the lower level memory allocator 104, then the state information field is changed from "Free" to "In use by buddy allocator" by the memory management sub-system 101. The state is changed back to "Free" by the memory management sub-system 101, if the block is freed back to lower level memory allocator 104. Similarly, if the client application 106 or 108 allocates memory from the modified buddy system memory allocator 102, the memory management sub-system 101 changes the state information field from "In use by buddy allocator" to "In use by client". The state information field is changed back to "In use by buddy allocator" from "In use by client" by the memory management sub-system 101, if the client application 106 or 108 returns the memory block back to the modified buddy system memory allocator 102.

An exemplary implementation of the modified buddy system memory allocator 102 comprises and/or employs a feature such as an exemplary search mechanism. Exemplary search mechanisms comprise a fast search mechanism and/or an indexer 103. The search mechanism in an example employs an exemplary data structure that serves to allow fast access to state information associated with an address. Exemplary addresses in the data structure comprise: a) addresses for memory blocks in use by the modified buddy system memory allocator 102 such as represented in FIG. 2; b) addresses for memory blocks on free block lists available for use by the modified buddy system memory allocator 102; and c) addresses for memory blocks in use by the client application 106 and/or 108. An exemplary implementation of the exemplary data structure comprises an exemplary array as follows.

| Address | Array Index | State Information |
| --- | --- | --- |
| 0x1000 | 0x1 | Free |
| 0x2000 | 0x2 | Client Application Use |
| 0x3000 | 0x3 | Client Application Use |

-continued

| Address | Array Index | State Information |
|---|---|---|
| 0x4000 | 0x4 | Free |
| ... | ... | |
| 0x3c007000 | 0x3c007 | Buddy Allocator Use (Block 234) |
| 0x3c00b000 | 0x3c00b | Buddy Allocator Use (Block 238) |
| 0x6b8a6000 | 0x6b8a6 | Buddy Allocator Use (Block 228) |
| ... | ... | ... |
| 0x7bc9c000 | 0x7bc9c | Buddy Allocator Use (Block 226) |

The exemplary fast search mechanism 103 in an example employs an address for indexing and associates the address with state information. In a further example, the exemplary fast search mechanism 103 may employ other exemplary and/or basic data structures such as hash tables and/or binary trees for indexing. The exemplary array employs a top forty-two bits of a sixty-four bit address for indexing into the exemplary array. Each array element in an example comprises some state information associated with the array element. The address 0x1000 in an example indexes into the first index 0x1 and its current state says that it is in use by the modified buddy system memory allocator 102. Similarly, the address 0x4000, which indexes into the 0x4 index, is "Free" to be allocated. For example, if the address 0x4000, which is in a free state, were to be allocated by the modified buddy system memory allocator 102, then the memory allocator sub-system would change the state of the address 0x4000 from "Free" to "In use by buddy allocator".

Referring again to FIGS. 4 and 5, to determine if the memory block that starts at address 0x71608000 is available in one of the free block lists 202, the modified buddy system memory allocator 102 in an example employs the fast search mechanism 103, to get the state information of that address. For example, the fast search mechanism 103 indexes into the exemplary array of addresses, to retrieve the state information. If the state information for the address 0x71608000 indicates that the memory block that starts at address 0x71608000 is not available in one of the free block lists 202, then STEP 504 returns "No" and STEP 416 proceeds to STEP 418. In this illustration, the memory block that starts at 0x71608000 is not available in any of the free block lists 202. Therefore, STEP 504 returns "No" and STEP 416 proceeds to STEP 418.

At STEP 418, the modified buddy system memory allocator 102 determines whether any more memory blocks are available in the free block list 216. If the free block list 216 does not have any additional free memory blocks, then STEP 418 proceeds to STEP 408 to determine whether more memory is available in the lower level memory allocator 104. If the free block list 216 does have one or more additional free memory blocks, then STEP 418 proceeds back to STEP 414.

When the modified buddy system memory allocator 102 executes STEP 414 for the second time, the modified buddy system memory allocator 102 will locate a second memory block in the free block list 216, for example, the memory block 224. The modified buddy system memory allocator 102 calculates the address ($Z_n$) of a memory block that would be contiguous to the memory block 224. The address ($Z_0$) of the memory block 224 for illustrative purposes is 0x6fc6c000. The memory block that is contiguous to the memory block 224 begins where the memory block 224 ends. Therefore, that contiguous memory block would have an address ($Z_n$) that is 16 KB greater than 0x6fc6c000, specifically, 0x6fc70000.

After the modified buddy system memory allocator 102 calculates that the address ($Z_n$) of the memory block that would be contiguous to the memory block 224 is 0x6fc70000, STEP 414 proceeds to STEP 416. At STEP 416, the modified buddy system memory allocator 102 searches the free block lists 202 for an available memory block with an address of 0x6fc70000. To determine if the memory block that starts at address 0x6fc70000 is available in one of the free block lists 202, the modified buddy system memory allocator 102 in an example indexes into the exemplary array of addresses to obtain the state information for that particular address. The state information for the address 0x6fc70000 in an example indicates that the memory block starting at 0x6fc70000 is marked as "In use by the buddy allocator" and is available in one of the free block lists 202.

After determining that the memory block that begins at 0x6fc70000 is available in one of the free block lists 202, the modified buddy system memory allocator 102 determines which of the free block lists 202 comprises that memory block. When a memory block is located in one of the free block lists 202, the size of the memory block is imprinted into the first few bits of the memory block. For example, when the memory block 232 is added to the free block list 218, the first few bits of the memory block are set to indicate that the memory block is 8 KB in size. Therefore, the first few bits of the memory block 232 indicate that the memory block 232 is located in the free block list 218. The modified buddy system memory allocator 102 then locates the memory block 232 that has the address 0x6fc70000 in the free block list 218, and STEP 504 (FIG. 5) returns "Yes" and STEP 416 proceeds to STEP 420.

At STEP 420, the modified buddy system memory allocator 102 determines if the contiguous memory blocks that have been located at this point in the exemplary logic 402 are collectively large enough to satisfy the request for the size (X) of memory. If the contiguous memory blocks located at this point in the exemplary logic 402 are collectively too small to satisfy the request, then STEP 420 proceeds to STEP 422. If the contiguous memory blocks located at this point in the exemplary logic 402 are collectively large enough to satisfy the request, then STEP 420 proceeds to STEP 424.

In this illustration, the requested size (X) is 28 KB. At this point in the exemplary logic 402, the modified buddy system memory allocator 102 has determined that the memory block 224 and the memory block 232 are both available and contiguous. The memory block 224 has a size of 16 KB and the memory block 232 has a size of 8 KB. So, the sum of the two contiguous memory blocks is 24 KB, which is too small to satisfy the request, and STEP 420 therefore proceeds to STEP 422.

At STEP 422, the modified buddy system memory allocator 102 continues to search for additional contiguous memory blocks until the plurality of contiguous, differently-sized memory blocks collectively add up to a size that is at least as large as the size of memory from the request. The modified buddy system memory allocator 102 calculates the address ($Z_n$) of a memory block that would be contiguous to the memory block 232. In an example, referring to FIG. 2, the address ($Z_0$) of the memory block 232 is 0x6fc70000. The memory block that is contiguous to the memory block 232 begins where the memory block 232 ends. Therefore, that contiguous memory block would have an address ($Z_n$) that is 8 KB greater than 0x6fc70000, specifically, 0x6fc72000. After the modified buddy system memory allocator 102 calculates that the address ($Z_n$) of the memory block that would be contiguous to the memory block 224 is 0x6fc72000, STEP 422 proceeds to STEP 416.

At STEP 416, the modified buddy system memory allocator 102 searches the free block lists 202 for an available memory block with an address of 0x6fc72000. The modified buddy system memory allocator 102 in an example retrieves state information for the address 0x6fc72000. The modified buddy system memory allocator 102 then indexes into the exemplary array to locate the memory block 236 that has the address 0x6fc72000 in the free block list 220, and STEP 416 proceeds to STEP 420.

At STEP 420, the modified buddy system memory allocator 102 determines if the contiguous memory blocks located at this point in the exemplary logic 402 are collectively large enough to satisfy the request for the size (X) of memory. In this illustration, the requested size (X) is 28 KB. At this point in the exemplary logic 402, the modified buddy system memory allocator 102 has determined that the memory block 224, the memory block 232, and the memory block 236 are all available and contiguous. The memory block 224 has a size of 16 KB, the memory block 232 has a size of 8 KB, and the memory block 236 has a size of 4 KB. So, the sum of the three contiguous memory blocks is 28 KB, which is large enough to satisfy the request, and STEP 420 therefore proceeds to STEP 424.

At STEP 424, if the plurality of contiguous memory blocks collectively adds up to a size that is larger than the requested size (X), then the modified buddy system memory allocator 102 returns the remainder to the appropriate free block lists 202. In this illustration, there was no remainder because the memory block 224, the memory block 232, and the memory block 236 add up to a size equal to the requested size (X). However, for other requested memory sizes a remainder may result. For example, if the requested size was 20 KB and the modified buddy system memory allocator 102 located a 16 KB memory block that is contiguous with an 8 KB memory block, then a remainder memory block that is 4 KB would result. The modified buddy system memory allocator 102 would add the 4 KB memory block to the free block list 220. After the modified buddy system memory allocator 102 determines whether there is a remainder to be added to the free block lists 202, STEP 424 proceeds to 426.

At STEP 426, the modified buddy system memory allocator 102 allocates the plurality of contiguous, differently-sized memory blocks to satisfy the request for the size (X) of memory. The plurality of contiguous, differently-sized memory blocks in an example has not been coalesced into a single memory block when the modified buddy system memory allocator 102 allocates the plurality of contiguous, differently-sized memory blocks to satisfy the memory request. The memory block 224 in an example is located at a beginning of a sequence of the plurality of contiguous, differently-sized memory blocks. To allocate the plurality of contiguous, differently-sized memory blocks to the client application 106, the modified buddy system memory allocator 102 provides an address of the memory block 224 to the client application 106. The client application 106 in an example assumes that that the address of the memory block 224 corresponds to a memory block of a size that is large enough to satisfy the request. In an example, it will not matter to the client application 106 whether the memory request is satisfied with a single memory block, or the plurality of contiguous, differently-sized memory blocks. For example, the client application 106 is able to write over the boundaries of the individual contiguous memory blocks. The modified buddy system memory allocator 102 is able to proceed regardless whether the address of the memory block 224 is aligned or nonaligned to the requested size (X) of memory; that is, the address of a first memory block or any other memory block to be combined in the plurality of contiguous, differently-sized memory blocks need not be a multiple of the requested size (X) of memory.

To complete the allocation, the modified buddy system memory allocator 102 removes the memory blocks 224, 232, and 236 from the free block lists 216, 218, and 220, respectively. If the client application 106 later releases the memory blocks 224, 232, and 236, then the modified buddy system memory allocator 102 will recreate the pointers for the memory blocks 224, 232, and 236 and add the memory blocks 224, 232, and 236 back into the free block lists 216, 218, and 220, respectively.

An exemplary implementation comprises a modified buddy system memory allocator that receives a request for a size of memory. The modified buddy system memory allocator identifies a plurality of contiguous, differently-sized memory blocks that are each smaller than the size of memory from the request. The modified buddy system memory allocator allocates the plurality of contiguous, differently sized memory blocks to satisfy the request for the size of memory.

The plurality of contiguous, differently sized memory blocks collectively adds up to a size that is at least as large as the size of memory from the request. A first memory block is located at a beginning of a sequence of the plurality of contiguous, differently sized memory blocks that collectively satisfies the request for the size of memory. The modified buddy system memory allocator provides an address of the first memory block to an application that made the request for the size of memory to allow the application to use the plurality of contiguous, differently sized memory blocks. The address of the first memory block is nonaligned to a rounded up to a next power of 2 value of the size of memory from the request.

A first free block list comprises one or more memory blocks that are of a first size. A second free block list comprises one or more memory blocks that are of a second size different than the first size. The plurality of contiguous, differently sized memory blocks comprises a first memory block of the one or more memory blocks that are of the first size. The plurality of contiguous, differently sized memory blocks comprises a second memory block of the one or more memory blocks that are of the second size. The modified buddy system memory allocator removes the first memory block from the first free block list and the second memory block from the second free block list to allocate the plurality of contiguous, differently sized memory blocks to an application that made the request for the size of memory. Upon release of the plurality of contiguous, differently sized memory blocks by the application, the modified buddy system memory allocator adds the first memory block back into the first free block list and the second memory block back into the second free block list.

A first free block list comprises one or more memory blocks that are of a first size. A second free block list comprises one or more memory blocks that are of a second size different than the first size. The first size and the second size are each smaller than the size of memory from the request. The first size and the second size collectively are at least as large as the size of memory from the request. The modified buddy system memory allocator searches the first free block list and the second free block list for a memory block from the first free block list and a memory block from the second free block list that are contiguous to satisfy the request for the size of memory.

Before allocating the plurality of contiguous, differently-sized memory blocks, the modified buddy system memory allocator searches for a single memory block that is larger than the size of memory from the request to satisfy the request. If the modified buddy system memory allocator does not locate a single memory block that is larger than the size of memory, then the modified buddy system memory allocator searches for the plurality of contiguous, differently-sized memory blocks that are each smaller than the size of memory and are collectively at least as large as the size of memory. The plurality of contiguous, differently sized memory blocks comprises three or more contiguous, differently sized memory blocks that are collectively at least as large as the size of memory. The plurality of contiguous, differently sized memory blocks has not been coalesced into a single memory block when the modified buddy system memory allocator allocates the plurality of contiguous, differently sized memory blocks to satisfy the request for the size of memory.

A search mechanism employs an address to index a set of memory blocks that comprises the plurality of contiguous, differently-sized memory blocks. The search mechanism associates state information with the address for each of the set of memory blocks; wherein the modified buddy system memory allocator identifies the plurality of contiguous, differently-sized memory blocks through employment of the state information that corresponds to the plurality of contiguous, differently-sized memory blocks.

An exemplary approach receives a request for allocation of a size of memory. A plurality of contiguous, differently-sized memory blocks that are each smaller than the size of memory from the request is identified. The plurality of contiguous, differently-sized memory blocks is organized in a plurality of different buddy system memory allocation free block lists. The plurality of contiguous, differently sized memory blocks is allocated to satisfy the request for the size of memory.

Additional contiguous memory blocks are searched for until the plurality of contiguous, differently sized memory blocks collectively adds up to a size that is at least as large as the size of memory from the request. A first memory block is located at a beginning of a sequence of the plurality of contiguous, differently sized memory blocks. An address of the first memory block is provided to an application that made the request for the size of memory to allow the application to use the plurality of contiguous, differently sized memory blocks. The plurality of contiguous, differently sized memory blocks is allocated to satisfy the request for the size of memory regardless of any alignment or nonalignment of any of the plurality of contiguous, differently sized memory blocks to a rounded up to a next power of 2 value of the size of memory from the request. The address of the first memory block is provided to the application that made the request to allow the application to use the plurality of contiguous, differently sized memory blocks regardless of any alignment or nonalignment of the address of the first memory block to the rounded up to the next power of 2 value of the size of memory from the request.

The plurality of contiguous, differently sized memory blocks is allocated to satisfy the request without coalescing the plurality of contiguous, differently sized memory blocks into a single memory block. An address is employed to index a set of memory blocks that comprises the plurality of contiguous, differently-sized memory blocks. State information is associated with the address for each of the set of memory blocks. The plurality of contiguous, differently-sized memory blocks is identified through employment of the state information that corresponds to the plurality of contiguous, differently-sized memory blocks.

An exemplary approach receives a request for allocation of a size of memory. A first memory block is identified in a first modified buddy system memory allocation free block list of a first modified buddy system memory allocator. A size of the first memory block is smaller than the size of memory from the request. A second modified buddy system memory allocation free block list of a second modified buddy system memory allocator is searched for a second memory block that is contiguous with the first memory block. The second memory block is identified in the second modified buddy system memory allocation free block list. A size of the second memory block is different from the size of the first memory block and is smaller than the size of memory from the request. The first memory block and the second memory block are allocated to a client application to satisfy the request for the size of memory.

A single memory block that is larger than the size of memory is searched for to satisfy the request. The single memory block that is larger than the size of memory is determined to be unavailable. A plurality of contiguous, differently-sized memory blocks that are each smaller than the size of memory and are collectively at least as large as the size of memory is searched for. The plurality of contiguous, differently-sized memory blocks comprises the first memory block and the second memory block.

An implementation of the apparatus 100 in an example comprises a plurality of components such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer-readable signal-bearing media. A computer-readable signal-bearing medium in an example stores software, firmware and/or assembly language for performing one or more portions of one or more implementations. An example of a computer-readable signal-bearing medium for an implementation of the apparatus 100 comprises the recordable data storage medium 150 of the modified buddy system memory allocator 102. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are exemplary. There may be variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
  a modified buddy system memory allocator configured to receive a request for a size of memory;
  wherein the modified buddy system memory allocator is configured to identify a plurality of contiguous, differently-sized memory blocks that are each smaller than the size of memory from the request;
  wherein the modified buddy system memory allocator is configured to allocate the plurality of contiguous, differently-sized memory blocks to satisfy the request for the size of memory, wherein a first free block list comprises one or more memory blocks that are of a first size, wherein a second free block list comprises one or more memory blocks that are of a second size different than the first size;

wherein the plurality of contiguous, differently-sized memory blocks comprise a first memory block of the one or more memory blocks that are of the first size, wherein the plurality of contiguous, differently-sized memory blocks comprise a second memory block of the one or more memory blocks that are of the second size;

wherein the modified buddy system memory allocator is configured to remove the first memory block from the first free block list and the second memory block from the second free block list to allocate the plurality of contiguous, differently-sized memory blocks to an application that made the request for the size of memory, wherein upon release of the plurality of contiguous, differently-sized memory blocks by the application, the modified buddy system memory allocator is to add the first memory block back into the first free block list and the second memory block back into the second free block list.

2. An apparatus, comprising:

a storage to store free block lists of respective different sizes of free memory blocks; and a modified buddy system memory allocator configured to receive a request for a size of memory;

wherein the modified buddy system memory allocator is configured to, in response to determining that a memory block larger than or equal in size to the size of memory from the request is unavailable, identify a plurality of contiguous, differently-sized memory blocks from the free block lists, wherein the plurality of contiguous, differently-sized memory blocks each has a size smaller than the size of memory from the request;

wherein the modified buddy system memory allocator is configured to allocate the plurality of contiguous, differently-sized memory blocks to satisfy the request for the size of memory, wherein the plurality of contiguous, differently-sized memory blocks have not been coalesced into a single memory block when the modified buddy system memory allocator allocates the plurality of contiguous, differently-sized memory blocks to satisfy the request for the size of memory.

3. The apparatus of claim 2, wherein the plurality of contiguous, differently-sized memory blocks collectively add up to a size that is at least as large as the size of memory from the request.

4. The apparatus of claim 2, wherein a first memory block is located at a beginning of a sequence of the plurality of contiguous, differently-sized memory blocks that collectively satisfy the request for the size of memory;

wherein the modified buddy system memory allocator is configured to provide an address of the first memory block to an application that made the request for the size of memory to allow the application to use the plurality of contiguous, differently-sized memory blocks.

5. The apparatus of claim 2, wherein a first of the free block lists comprises one or more memory blocks that are of a first size, wherein a second of the free block lists comprises one or more memory blocks that are of a second size different than the first size;

wherein the plurality of contiguous, differently-sized memory blocks comprise a first memory block of the one or more memory blocks that are of the first size, wherein the plurality of contiguous, differently-sized memory blocks comprise a second memory block of the one or more memory blocks that are of the second size;

wherein the modified buddy system memory allocator is to remove the first memory block from the first free block list and the second memory block from the second free block list to allocate the plurality of contiguous, differently-sized memory blocks to an application that made the request for the size of memory.

6. The apparatus of claim 2, wherein a first of the free block lists comprises one or more memory blocks that are of a first size, wherein a second of the free block lists comprises one or more memory blocks that are of a second size different than the first size;

wherein the first size and the second size are each smaller than the size of memory from the request, wherein the first size and the second size collectively are at least as large as the size of memory from the request;

wherein the modified buddy system memory allocator is configured to search the first free block list and the second free block list for a memory block from the first free block list and a memory block from the second free block list that are contiguous to satisfy the request for the size of memory.

7. The apparatus of claim 2, wherein the plurality of contiguous, differently-sized memory blocks comprise three or more contiguous, differently-sized memory blocks that are collectively at least as large as the size of memory.

8. The apparatus of claim 2, further comprising:

a search mechanism that:

employs an address to index a set of memory blocks that comprises the plurality of contiguous, differently-sized memory blocks; and associates state information with the address for each of the set of memory blocks;

wherein the modified buddy system memory allocator is configured to identify the plurality of contiguous, differently-sized memory blocks through employment of the state information that coffesponds to the plurality of contiguous, differently-sized memory blocks.

9. A method, comprising the steps of:

storing, in a storage, a plurality of buddy system memory allocation free block lists of respective different sizes of free memory blocks;

receiving, by a computer, a request for allocation of a size of memory;

determining, from one of the plurality of free block lists by the computer, whether a memory block having a size larger than or equal to the size of the memory from the request is available;

if the memory block having the size larger than or equal to the size of the memory from the request is unavailable;

identifying, by the computer, a plurality of contiguous, differently-sized memory blocks that are each smaller than the size of memory from the request, wherein the plurality of contiguous, differently-sized memory blocks are associated with at least two of the plurality of buddy system memory allocation free block lists; and allocating, by the computer, the plurality of contiguous, differently-sized memory blocks to satisfy the request for the size of memory, wherein the step of allocating comprises the step of:

allocating the plurality of contiguous, differently-sized memory blocks to satisfy the request without coalescing the plurality of contiguous, differently-sized memory blocks into a single memory block.

10. The method of claim 9, wherein the step of identifying comprises the step of:
searching for additional contiguous memory blocks until the plurality of contiguous, differently-sized memory blocks collectively add up to a size that is at least as large as the size of memory from the request.

11. The method of claim 9, wherein a first memory block is located at a beginning of a sequence of the plurality of contiguous, differently-sized memory blocks;
wherein the step of allocating comprises the step of:
providing an address of the first memory block to an application that made the request for the size of memory to allow the application to use the plurality of contiguous, differently-sized memory blocks.

12. The method of claim 11, wherein the step of allocating comprises the step of:
allocating the plurality of contiguous, differently-sized memory blocks to satisfy the request for the size of memory regardless of any alignment or nonalignment of any of the plurality of contiguous, differently-sized memory blocks to a rounded up to a next power of 2 value of the size of memory from the request;
wherein the step of providing comprises the step of:
providing the address of the first memory block to the application that made the request to allow the application to use the plurality of contiguous, differently-sized memory blocks regardless of any alignment or nonalignment of the address of the first memory block to the rounded up to the next power of 2 value of the size of memory from the request.

13. The method of claim 9, further comprising the steps of:
employing an address to index a set of memory blocks that comprises the plurality of contiguous, differently-sized memory blocks; and
associating state information with the address for each of the set of memory blocks;
wherein the step of identifying comprises the step of:
identifying the plurality of contiguous, differently-sized memory blocks through employment of the state information that corresponds to the plurality of contiguous, differently- sized memory blocks.

14. An apparatus, comprising:
a storage to store free block lists of respective different sizes of free memory blocks; and
a modified buddy system memory allocator configured to receive a request for a size of memory;
wherein the modified buddy system memory allocator is configured to, in response to determining that a memory block larger than or equal in size to the size of memory from the request is unavailable, identify a plurality of contiguous, differently-sized memory blocks from the free block lists, wherein the plurality of contiguous, differently-sized memory blocks each has a size smaller than the size of memory from the request;
wherein the modified buddy system memory allocator is configured to allocate the plurality of contiguous, differently-sized memory blocks to satisfy the request for the size of memory,
wherein the modified buddy system memory allocator is configured to:
identify a first of the plurality of contiguous, differently-sized memory blocks from a first of the free block lists;
determine whether a second of the free block lists has a free memory block that starts at an address that is contiguous with an end of the first of the plurality of contiguous, differently-sized memory blocks; and
if the second free block list has the free memory block, use the free memory block of the second free block list as a second of the plurality of contiguous, differently-sized memory blocks.

15. The apparatus of claim 14, wherein the modified buddy system memory allocator is configured to further:
in response to determining that the first free block list does not have any free memory blocks, determine whether additional memory is available from a lower level memory allocator that is located at a lower level than the modified buddy system memory allocator;
wherein if the additional memory is available, the additional memory is allocated from the lower level memory allocator to the modified buddy system memory allocator.

16. A method, comprising the steps of:
receiving, by a computer, a request for allocation of a size of memory;
identifying, by the computer, a plurality of contiguous, differently-sized memory blocks that are each smaller than the size of memory from the request, wherein the plurality of contiguous, differently-sized memory blocks are organized in a plurality of different buddy system memory allocation free block lists; and
allocating, by the computer, the plurality of contiguous, differently-sized memory blocks to satisfy the request for the size of memory;
wherein a first free block list comprises one or more free memory blocks that are of a first size, wherein a second free block list comprises one or more free memory blocks that are of a second size different than the first size;
wherein the plurality of contiguous, differently-sized memory blocks comprise a first memory block of the one or more free memory blocks that are of the first size, wherein the plurality of contiguous, differently-sized memory blocks comprise a second memory block of the one or more free memory blocks that are of the second size;
wherein the first memory block is removed from the first free block list and the second memory block is removed from the second free block list to allocate the plurality of contiguous, differently-sized memory blocks to an application that made the request for the size of memory;
wherein upon release of the plurality of contiguous, differently-sized memory blocks by the application, the first memory block is added back into the first free block list and the second memory block is added back into the second free block list.

17. A method, comprising the steps of:
storing, in a storage, a plurality of buddy system memory allocation free block lists of respective different sizes of free memory blocks;
receiving, by a computer, a request for allocation of a size of memory;
determining, from one of the plurality of free block lists by the computer, whether a memory block having a size larger than or equal to the size of the memory from the request is available;
if the memory block having the size larger than or equal to the size of the memory from the request is unavailable;
identifying, by the computer, a plurality of contiguous, differently-sized memory blocks that are each smaller than the size of memory from the request, wherein the plurality of contiguous, differently-sized memory blocks are associated with at least two of the plurality of buddy system memory allocation free block lists; and allocating, by the computer, the plurality of contiguous, differently-sized memory blocks to satisfy the request for the size of memory, wherein identifying the plurality of contiguous, differently-sized memory blocks comprises:

identifying a first of the plurality of contiguous, differently-sized memory blocks from a first of the buddy system memory allocation free block lists;

determining whether a second of the buddy system memory allocation free block lists has a free memory block that starts at an address that is contiguous with an end of the first of the plurality of contiguous, differently-sized memory blocks; and if the second buddy system memory allocation free block list has a free memory block, using the free memory block of the second buddy system memory allocation free block list as a second of the plurality of contiguous, differently-sized memory blocks.

18. The method of claim 17, wherein identifying the plurality of contiguous, differently-sized memory blocks further comprises:

in response to determining that the first buddy system memory system free block list does not have any free memory blocks, determining whether additional memory is available from a lower level memory allocator that is located at a lower level than a buddy system memory allocator that identifies the plurality of contiguous, differently-sized memory blocks, wherein if the additional memory is available, the additional memory is allocated from the lower level memory allocator to the buddy system memory allocator.

* * * * *

UNITED STATES PATENT AND TRADEMARK OFFICE
CERTIFICATE OF CORRECTION

PATENT NO. : 7,610,468 B2
APPLICATION NO. : 11/553444
DATED : October 27, 2009
INVENTOR(S) : Prashanth Madisetti It is certified that error appears in the above-identified patent and that said Letters Patent is hereby corrected as shown below:

In column 16, line 38, in Claim 8, delete "coffesponds" and insert -- corresponds --, therefor.

In column 17, line 42, in Claim 13, delete "differently- sized" and insert -- differently-sized --, therefor.

In column 20, line 9, in Claim 18, delete "system" and insert -- allocation --, therefor.

Signed and Sealed this

Twenty-third Day of February, 2010

David J. Kappos
*Director of the United States Patent and Trademark Office*